United States Patent
Gouy et al.

(10) Patent No.: US 10,630,386 B2
(45) Date of Patent: Apr. 21, 2020

(54) METHOD AND SYSTEM FOR LASER-BASED COMMUNICATION BETWEEN A GROUND STATION AND A MOBILE CRAFT

(71) Applicant: ARIANEGROUP SAS, Paris (FR)

(72) Inventors: Yann Gouy, Paris (FR); Bruno Esmiller, Villennes sur seine (FR); Justine Serier, Fresnes (FR); Yves Domaine, Vernouillet (FR); Emilie Steck, Houilles (FR)

(73) Assignee: ARIANEGROUP SAS, Paris (FR)

( * ) Notice: Subject to any disclaimer, the term of this patent is extended or adjusted under 35 U.S.C. 154(b) by 0 days.

(21) Appl. No.: 16/464,654

(22) PCT Filed: Nov. 28, 2017

(86) PCT No.: PCT/FR2017/000223
§ 371 (c)(1),
(2) Date: May 28, 2019

(87) PCT Pub. No.: WO2018/100257
PCT Pub. Date: Jun. 7, 2018

(65) Prior Publication Data
US 2019/0386747 A1    Dec. 19, 2019

(30) Foreign Application Priority Data

Dec. 2, 2016   (FR) ..................................... 16 01714

(51) Int. Cl.
*H04B 10/118* (2013.01)
*H04B 7/185* (2006.01)
*H04B 10/50* (2013.01)

(52) U.S. Cl.
CPC ....... *H04B 10/118* (2013.01); *H04B 7/18517* (2013.01); *H04B 10/503* (2013.01)

(58) Field of Classification Search
CPC ................................................... H04B 10/118
See application file for complete search history.

(56) References Cited

U.S. PATENT DOCUMENTS

| 5,909,299 A | * | 6/1999 | Sheldon, Jr. | ........... B64G 1/105 |
| | | | | 398/125 |
| 6,002,360 A | * | 12/1999 | Wolcott | ............. H04B 7/18576 |
| | | | | 342/354 |

(Continued)

OTHER PUBLICATIONS

Gouy et al.; The C3PO Project: A Laser Communication System Concept for Small Satellites; Nov. 13, 2016 [online], [retrieved on Dec. 9, 2019]. Retrieved from the Internet <URL:https://elib.dlr.de/107406/1/C3PO%20paper%204S%20Symposium.pdf> (Year: 2016).*

(Continued)

*Primary Examiner* — Nathan M Cors
(74) *Attorney, Agent, or Firm* — Christensen O'Connor Johnson Kindness PLLC (57) ABSTRACT

An emission/reception device is configured for communication between a ground station and a mobile craft which is provided with a retro-reflector configured to modulate a laser beam received along a direction and to return it along the direction, the mobile craft being situated above a backscattering zone, the emission/reception device generating at least two temporally offset emission/reception sequences, each being associated with a laser beam and comprising successive pairs of associated emission and reception phases, the emission phase including emitting a laser beam from the ground station towards the mobile craft, and the reception phase including receiving a laser beam returned by the retro-reflector, each reception phase being deactivated during the transit through the backscattering zone of the laser beam emitted during the associated emission phase.

12 Claims, 3 Drawing Sheets

(56) References Cited

U.S. PATENT DOCUMENTS

| | | | | |
|---|---|---|---|---|
| 7,317,876 B1* | 1/2008 | Elliott | ............... | H04B 10/2587 |
| | | | | 398/140 |
| 8,077,294 B1* | 12/2011 | Grund | ................... | G01N 21/65 |
| | | | | 356/4.01 |
| 2006/0179456 A1 | 8/2006 | Toyoshima et al. | | |
| 2009/0202254 A1 | 8/2009 | Majumdar et al. | | |
| 2011/0311234 A1 | 12/2011 | Almassy et al. | | |
| 2017/0141849 A1* | 5/2017 | Thangavelautham | ....................... | |
| | | | | H04B 10/118 |

OTHER PUBLICATIONS

Kaushal et al.; "Optical Communication in Space: Challenges and Mitigation Techniques," IEEE Communications Surveys & Tutorials, vol. 19, No. 1, pp. 57-96; Aug. 26, 2016 [online]. <URL: https://ieeexplore.ieee.org/stamp/stamp.jsp?tp=&arnumber=7553489>. (Year: 2016).*

Salas, A.G. et al., "Modulating Retro-Reflectors: Technology, Link Budget and Applications", Sep. 12, 2012 (Sep. 12, 2012), XP055399610, Retrieved from the Internet, URL:https://ntrs.nasa.gov/archive/nasa/casi.ntrs.nasa.gov/20120016693.pdf, Résumé. Sections: I.II;, figure 1, 6 pages.

International Search Report and Written Opinion dated Feb. 23, 2018, issued in corresponding International Application No. PCT/FR2017/000223, filed Nov. 28, 2017, 15 pages.

* cited by examiner

METHOD AND SYSTEM FOR LASER-BASED COMMUNICATION BETWEEN A GROUND STATION AND A MOBILE CRAFT

The present invention relates to a method and a system for laser-based communication between a ground station and a mobile craft, in particular a satellite.

Within the framework of the present invention, the ground station is in particular provided with an emission system comprising at least one laser emitter able to emit a laser beam in the direction of the mobile craft and a system for receiving a returned laser beam, and the mobile craft is provided with at least one retro-reflector.

In addition, within the framework of the present invention, this retro-reflector is configured to modulate a laser beam, received from the ground station in a given direction, and to return it, after modulation, following the same direction.

This laser-based mode of communication may be used for communicating with any mobile craft, in particular a flying craft such as an airplane or a drone, able to fly at a certain altitude above the atmosphere, as specified below. However, this mode of communication is preferably used for a mobile craft corresponding to a satellite.

Although not exclusively, this mode of communication applies more specifically to satellites moving at low altitudes, at a low earth orbit—LEO ("Low Earth Orbit").

However, for these satellites, the ground visible time on each transit is very short, of the order of a few minutes.

Moreover, the present invention relates in particular to improving the performance (increased throughput) of laser-based communication in such a case.

Furthermore, such a mode of laser-based communication, in the atmosphere, presents a major disadvantage. Indeed, when the laser beam emitted from the ground propagates through the atmosphere, backscattering of the beam by the medium is observed. This backscattering phenomenon then generates a level of signal that is much higher than the one coming from the retro-reflector mounted on a satellite located beyond the atmosphere. Because of this phenomenon, communication based on a continuous laser emission is excluded.

The present invention has an object to remedy to this disadvantage. It concerns a communication method between, on the one hand, a ground station provided with an emission system comprising at least one laser emitter able to emit a laser beam in the direction of a mobile craft and a reception system for a laser beam, and on the other hand, the mobile craft, which is provided with at least one retro-reflector able to modulate a laser beam received from the ground station along a reception direction and to return it along this reception direction, said mobile craft being located above a so-called backscattering zone of the Earth.

According to the invention, this method is noteworthy in that:
- at least two emission/reception sequences are generated, each one being associated with a laser beam, the laser beams for different emission/reception sequences featuring different wavelengths;
- each one of said emission/reception sequences comprises successions of a pair of associated emission and reception phases, an emission phase consisting of emitting a laser beam from the ground station towards the mobile craft, and a reception phase consisting of receiving a laser beam previously emitted by the ground station during the associated emission phase and returned by the retro-reflector of the mobile craft, the reception phase being deactivated as long as the laser beam emitted during the associated emission phase and backscattered by the backscattering zone is capable of being received (and detected) at the ground station (i.e. it is present in the ground station's receiving input), the emission phase of a pair of emission and reception phases being activated at the end of the reception phase of the preceding pair of emission and reception phases; and
- the emission phases (and therefore also the reception) of an emission/reception sequence are temporally offset with respect to the emission phases (and therefore also reception) of the other emission/reception sequence.

Within the framework of the present invention, the backscattering zone is a zone located above the Earth, in which, for an emitted laser beam, the laser flux backscattered by this zone is of at least the order of magnitude of the laser flux returned by the retro-reflector.

Thus, the deactivation of the reception of a laser beam during the transit (propagation to and from the ground station) in the backscattering zone (corresponding roughly to the atmosphere) of the emitted laser beam prevents the reception from being disrupted by a backscattering phenomenon, and thus enables a laser beam to be used for communication.

In addition, at least two emission/reception sequences are generated, each one being associated with a given laser beam, so that, during the deactivation period of a given sequence, at least part of at least one other sequence is activated. This enables the throughput to be increased.

Therefore, thanks to the invention, it is possible to carry out laser-based communication that is not disrupted by backscattering and which features a high throughput.

In a preferred embodiment, three different emission/reception sequences are generated. This enables further increasing the throughput and specially creating a continuous communication, as specified below.

In this preferred embodiment, at least two successive emission/reception sequences, among the aforementioned three emission/reception sequences, partially overlap from a temporal point of view.

In a first variant, at least a part of the data generated during the temporal overlap, via the corresponding laser beams, is used to carry out the synchronization of transmitted information for two successive sequences.

Furthermore, in a second variant, one of the laser beams is modulated during part of the temporal overlap, to transmit a message so-called ascending from the ground station towards the mobile craft.

Also, advantageously, for a pair of associated emission and reception phases (of an emission/reception sequence):
- the emission phase is activated at the deactivation of the reception phase of the preceding pair, and it is deactivated at the end of a timeframe T1 following its activation, the timeframe T1 satisfying the following relationship:

$$T1 = (AC + BC)/c$$

wherein:
- c is the speed of light in the considered medium;
- AC is the distance between the ground station and the mobile craft; and
- BC=AC−AB, AB being the propagation distance of the laser beam emitted in the backscattering zone; and
- the reception phase is activated at the end of a timeframe T2 following deactivation of the associated emission phase, and it is deactivated at the end of a timeframe T3 following its activation, the timeframes T2 and T3 satisfying the following relationships:

$$T2=AB/c$$

$$T3=T1.$$

Preferably, the distance AB is determined from the height of the backscattering zone and the angle of elevation of the laser beam emitted.

The present invention also relates to an emission/reception device intended for communication between, on the one hand, a ground station and on the other, a mobile craft that is provided with at least one retro-reflector able to modulate a laser beam received along a reception direction, and to return it along this reception direction, said mobile craft being located above a so-called backscattering zone of the Earth.

Said emission/reception device comprises at least one emission system provided with at least one laser emitter able to emit a laser beam in the direction of the mobile craft, and at least one laser beam reception system.

According to the invention, said emission/reception device is configured to generate at least two emission/reception sequences, each one being associated with a laser beam, the laser beams of the different emission/reception sequences featuring different wavelengths, each emission/reception sequence comprising successions of a pair of associated emission and reception phases, an emission phase consisting of emitting a laser beam from the ground station towards the mobile craft, and a reception phase consisting of receiving a laser beam previously emitted by the ground station during the associated emission phase and returned by the retro-reflector of the mobile craft, said emission/reception device being configured to leave each reception phase deactivated as long as the laser beam emitted during the associated emission phase and backscattered by the backscattering zone is able to be received at the ground station, said emission/reception device being moreover configured to activate the emission phase of a pair of emission and reception phases at the end of the reception phase of the preceding pair of emission and reception phases, the emission phases of one sequence being temporally offset with respect to the emission phases of the other sequence.

Advantageously, this emission/reception device:
is configured to generate three emission/reception sequences; and/or
also comprises a tracking system.

Furthermore, the present invention concerns a communication system between a ground station and a mobile craft, in particular a satellite. According to the invention, this communication system comprises an emission/reception device as described above, which is installed in the ground station, and at least one retro-reflector, which is mounted on the mobile craft.

The appended figures will make it clear how the invention may be carried out. In these figures, the same references designate similar elements.

Figure 1:
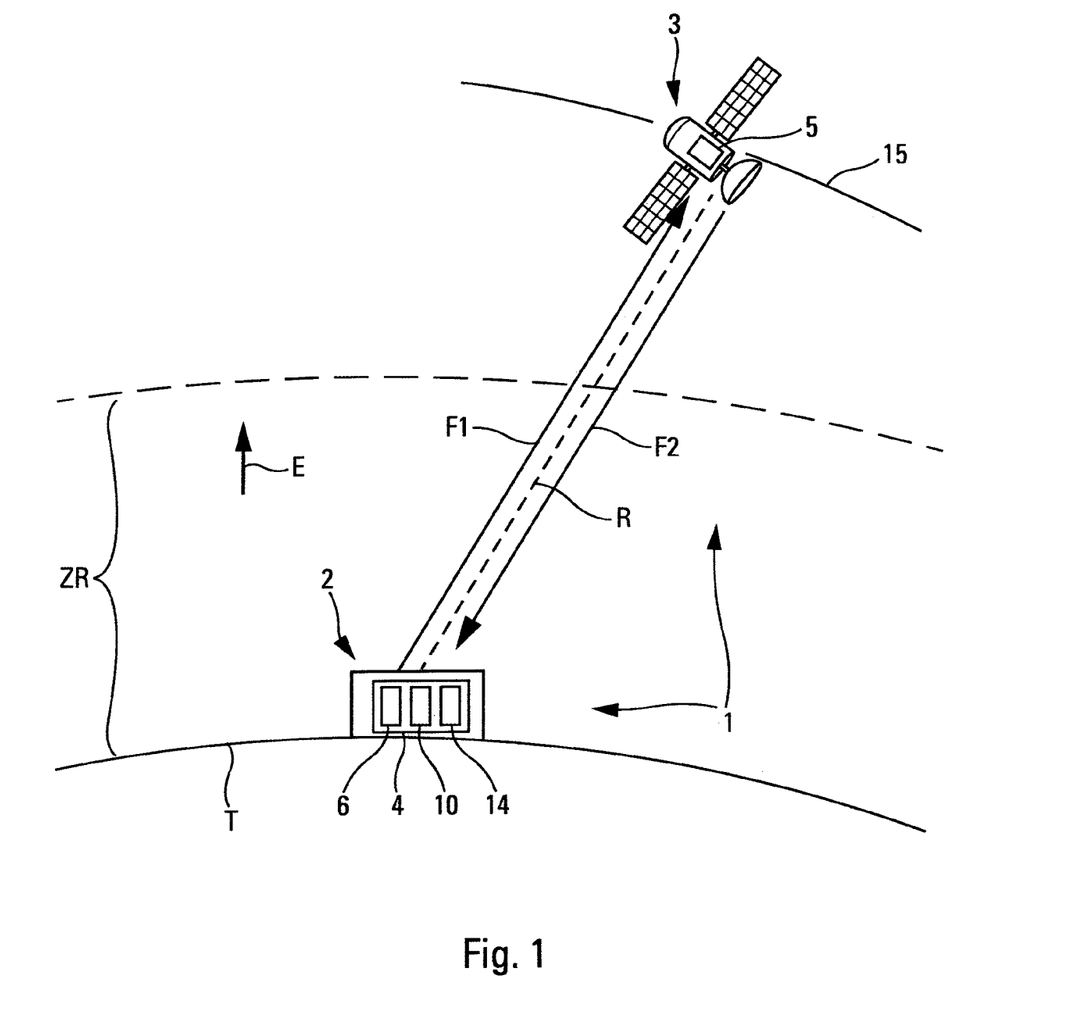
FIG. 1 is a schematic view of a ground/satellite mode of communication, implemented by means of a laser-based communication system in accordance with the invention.

The system 1 illustrating the invention and represented schematically in FIG. 1 is intended to generate communication between a ground station 2 installed on the Earth T and a mobile (flying) craft 3, in this case a satellite.

This system 1 comprises:
an emission/reception device 4 which is installed in the ground station 2; and
at least one retro-reflector 5 mounted on the mobile craft 3.

Said retro-reflector 5, for example of spherical type, is able in a usual manner to modulate a laser beam F1 received from the ground station 2 along a direction R, and to return the laser beam F2, after modulation, along this same direction R, as represented schematically in FIG. 1.

Within the framework of the present invention, said mobile craft 3 travels above a so-called backscattering zone ZR of the Earth T, corresponding roughly to the atmosphere. More specifically, the backscattering zone ZR is considered to be a zone located above the Earth T, in which, for an emitted laser beam, the laser flux backscattered by this zone is of at least the order of magnitude of the laser flux returned by the retro-reflector mounted on the mobile craft that travels above this zone. Preferably, it is considered that the backscattering zone is exited upwards (in the direction of the arrow E), as soon as the backscattered laser flux is of the same order of magnitude as the related disruptions and optical linkage sounds.

It should be noted that atmospheric diffusion is negligible on the return journey of the laser beam, as the intensity of the laser beam reflected by the retro-reflector is much weaker than the intensity of the laser beam emitted (around one million times weaker for a retro-reflector located 1000 km from the ground station).

Figure 2:
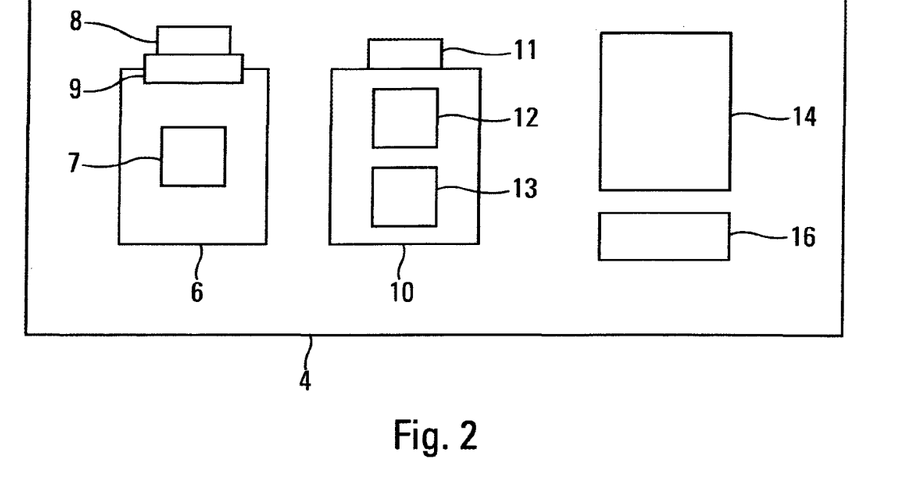
FIG. 2 is the synoptic diagram of a particular embodiment of an emission/reception device in accordance with the invention.

The aforementioned emission/reception device 4 comprises, as represented very schematically in FIG. 2:
at least one emission system 6 provided with at least one laser emitter (or source) 7 able to emit a laser beam F1 in the direction of the mobile craft 3 (FIG. 1). The emission system 6 also comprises the following elements: an emission telescope 8 mounted on a motorised turret 9, and mirrors (not represented) enabling the laser emitter 7 to be coupled with the telescope 8; and
at least one reception system 10, configured to receive a returned laser beam F2.

This reception system 10 comprises, as represented in FIG. 2:
a telescope 11 collecting the laser beam modulated and returned by the retro-reflector;
a detector 12 converting the light modulation received into electrical modulation; and
a demodulator 13 processing the electrical modulation in such a way as to decode the information contained in the laser beam.

The emission/reception device 4 also comprises a tracking system 14.

The tracking system 14 ensures the aiming of the laser emitter 7 towards the mobile craft 3 with which the establishment of communication is desired. This aiming may be carried out:
by observing the mobile craft 3 with the aid of a telescope and a camera. In this case, the mobile craft 3 is centred at the centre of the camera field. With the tracking telescope being aligned with the emission telescope, the mobile craft 3 is then illuminated by the laser beam (to parallax errors close). In this configuration, the mobile craft 3 has to be illuminated by the sun to be visible to the tracking system 14; or by knowing precisely the trajectory of the mobile craft 3, in this case the satellite's orbit 15. In this case, the co-ordinates of the mobile craft 3 are sent directly to the emission system 6.

According to the invention, the aforementioned emission/reception device 4 comprises at least one emission system 6, and at least one reception system 10, able to generate at least two different emission/reception sequences S1, S2.

Each of these emission/reception sequences S1, S2 enables an associated laser beam to be emitted and received. The laser beams of different emission/reception sequences S1, S2 feature different wavelengths. These wavelengths are chosen so as to be sufficiently distant from one another that they can be spectrally filtered, in order to be able to distinguish one laser beam from the other.

Each emission/reception sequence S1, S2 comprises series of a pair of phases, each pair of phases comprising an emission phase PHE and a reception phase PHR, which are associated. An emission phase PHE is intended to emit a laser beam F1 from the ground station 2 towards the mobile craft 3 (with the aid of the emission system 6), and a reception phase PHR is intended to receive (with the aid of the reception system 10) a laser beam F2 previously emitted by the ground station 2 during the associated emission phase PHE, and returned by the retro-reflector 5 of the mobile craft 3 after modulation.

According to the invention, said emission/reception device 4 is configured as specified below:

to deactivate each reception phase PHR during the transit in the backscattering zone ZR of the laser beam F1 emitted during the associated PHE emission phase. Preferably, each reception phase is deactivated as long as the emitted and backscattered laser beam signal is present in the reception input of the ground station; and to activate the emission phase PHE of a pair of emission and reception phases, at the end of the reception phase of the preceding pair of emission and reception phases.

To do this, the following are calculated over time:

the emission timeframe during which the laser beam F1 is emitted by the emission system 6 that is activated, while the associated reception system 10 is deactivated; and the reception timeframe during which the laser beam F2 is received by the reception system 10 that is activated, while the associated emission system 6 is deactivated.

As a result, to remedy the problem of backscattering, the laser reception is deactivated (or cut) during the time when the laser beam F1 is propagating in the backscattering zone ZR. This cut corresponds to more or less half of the usage time, which reduces communication throughput accordingly. Also, to increase throughput, the system 1 uses several pairs of lasers/detectors (or emission/reception sequences), operating at different wavelengths.

The emission phases of one sequence are temporally offset in relation to the emission phases of the other sequence, as specified below in reference to FIG. 5.

Figure 3:
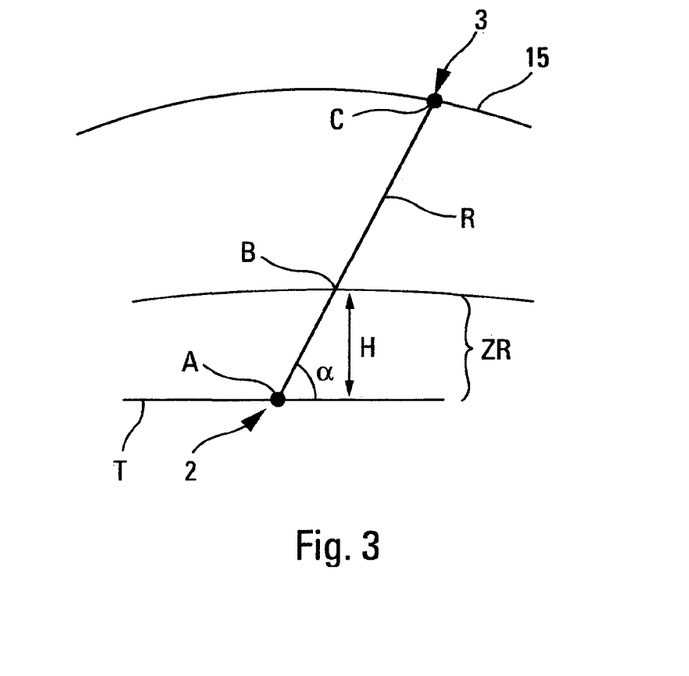
FIG. 3 is a graphic specifying different distances taken into account in the implementation of the present invention.
Figure 4A:
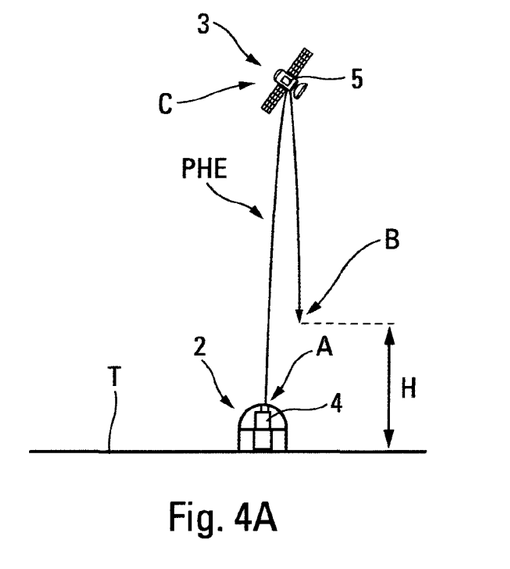
FIGS. 4A and 4B illustrate laser beams relating to one emission phase and one reception phase respectively.

More specifically, for one pair of an associated emission phase PHE and reception phase PHR (in an emission/reception sequence S1, S2):

the emission phase PHE (FIG. 4A) is activated at the deactivation of the reception phase PHR of the preceding pair, and is deactivated at the end of a timeframe T1 following its activation, the timeframe T1 satisfying the following relationship:

$$T1=(AC+BC)/c$$

wherein:

c is the speed of light in the considered medium;

AC is the distance between the ground station 2 (located at a position A) and the mobile craft 3 (located at a position C); and BC=AC−AB, AB being the propagation distance of the laser beam F1 emitted in the backscattering zone ZR. The point B corresponds to the intersection between the direction R (linking A to C) and the upper end of the backscattering zone ZR, as represented in FIG. 3; and the reception phase PHR (FIG. 4B) is activated at the end of a timeframe T2, after deactivation of the associated emission phase, and it is deactivated at the end of a timeframe T3 after its activation, the timeframes T2 and T3 satisfying the following relationships:

$$T2=AB/c$$

$$T3=T1.$$

In a particular embodiment, the device 4 comprises, as represented in FIG. 2, a calculation unit 16 to determine the distance AB. Preferably, the distance AB is determined on the basis of the height H of the backscattering zone ZR and the angle of elevation a of the emitted laser beam, as represented in FIG. 3.

More precisely, knowing the trajectory 15 of the mobile craft 3 (from the orbital parameters) and the position A (latitude/longitude) of the ground station 2, the calculation unit 16 deduces the angle of elevation a of the laser beam (or of the direction R) over time, then the distance AB over which the backscattering zone ZR backscatters the radiation. The calculation unit 16 also determines, in the usual manner, the distance AC between the ground station 2 and the mobile craft 3, taking into account the trajectory 15 (orbit) of the latter.

Emission and reception timeframes for other sequences (emission system/reception system pairs) are calculated in the same way as stated above.

Figure 5:
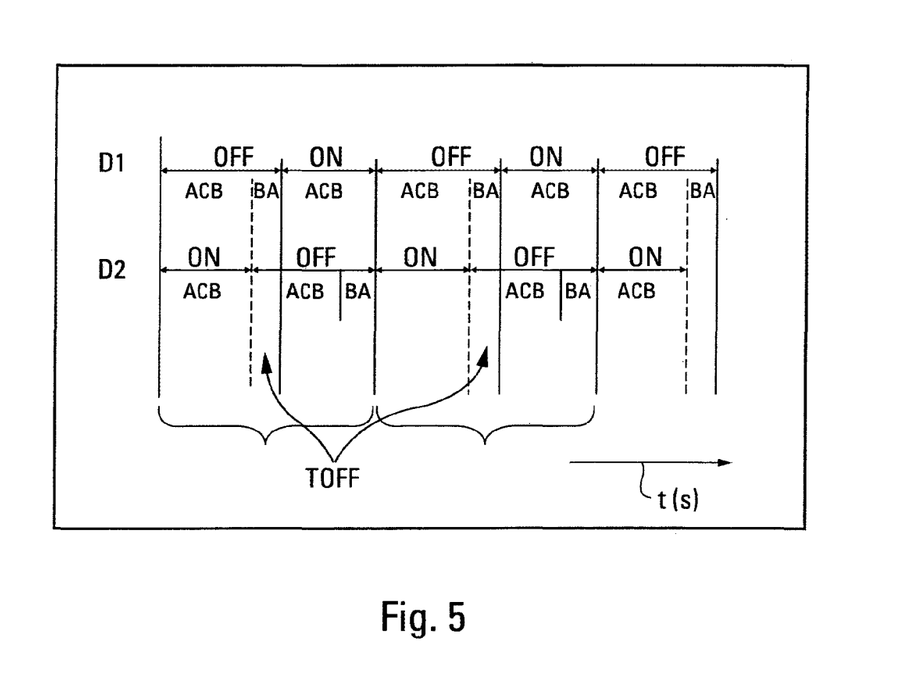
FIG. 5 is a graphic illustrating the respective activation and deactivation of detection phases in two different sequences over time.

FIG. 5 represents the activation (ON) and deactivation (OFF) of the reception phases, noted as D1 and D2 respectively, of two different sequences, over time $t$ expressed, for example, in seconds s.

Figure 4B:
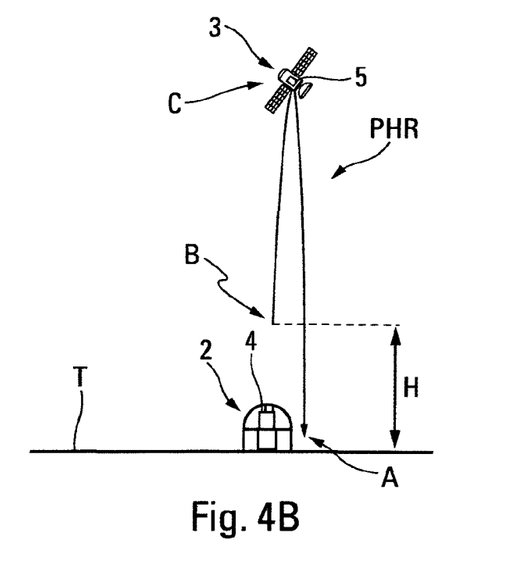

The timeframe is illustrated by ACB and BA, corresponding to the timeframe during which a laser beam travels, respectively:

the distances AC and CB (for "ACB"), as represented in FIGS. 3, 4A and 4B; and the distance BA (for "BA").

By using two laser beams (with different wavelengths), there is therefore a time lapse during which no reception is achieved. This time lapse is equal to the timeframe TOFF for the path BA, as indicated in FIG. 5.

To avoid a lack recovery of laser emissions (and thus a lack of recovery of receptions), the device 4 generates, preferably, three different emission/reception sequences, with three different wavelengths. This ensures a continuous communication link, by activating the reception phase of the third sequence, at least during the entire time TOFF (FIG. 5), when the reception phases D1 and D2 of the two first sequences are deactivated.

In this preferred embodiment comprising three different emission/reception sequences, with an activation timeframe for the reception phase of the third sequence that is higher than the time TOFF, at least two successive emission/ reception sequences, among the aforementioned three emission/reception sequences, overlap partially from a temporal point of view.

The duration of the overlap can be distributed over two specific sequences only, or over the three sequences (each time at the junction of two successive sequences). The information emitted during this temporal overlap may be managed and used in different ways.

In a first variant, at least part of the data generated during the temporal overlap, via the corresponding laser beams, is used to carry out the synchronisation of transmitted information.

Furthermore, in a second variant, at least part of the data emitted, via one of the laser beams, during the temporal overlap, is used to transmit a message so-called ascending from the ground station 2 towards the mobile craft 3. By way of illustration, information enabling modulation to be optimised, for example in connection with observation conditions, could in particular be transmitted to the retro-reflector 5 of the mobile craft 3.

The system 1, as described above, features a number of advantages. In particular, the emission of several laser beams with the aforementioned activations/deactivations, enables backscattering of the laser beams by the backscattering zone to be avoided. This therefore increases the communication throughput and ensures a continuous communication link during the entire period of visibility during transit of a satellite.

Although not exclusively, the present invention applies more particularly to communication with mini-satellites, micro-satellites, or nano-satellites of "CubeSat" type, requiring high levels of communication throughput or a very directional communication link, with minimal power consumption. The present invention is appropriate for satellites of this type, which feature low useful payload capacities, and low available electrical power.

The invention claimed is:

1. A method for communication between a ground station and a mobile craft located above a backscattering zone of the Earth, the ground station having an emission system with at least one laser emitter configured to emit plurality of laser beams in a direction of the mobile craft, and a laser reception system, the mobile craft having at least one retro-reflector configured to modulate the plurality of laser beams received from the ground station along a reception direction and to return it along the reception direction, the method comprising:

generating at least a first emission/reception sequence and a second emission/reception sequence, the first emission/reception sequence being associated with a first laser beam having a first wavelength, the second emission/reception sequence being associated with a second laser beam having a second wavelength that differs from the first wavelength, wherein each of the first and the second emission/reception sequences comprises successions of a pair of an emission phase and a reception phase, the emission phase including emitting the associated first or second laser beam from the ground station towards the mobile craft, and the reception phase including receiving the associated first or second laser beam previously emitted by the ground station during the emission phase and returned by the retro-reflector of the mobile craft, the reception phase being deactivated as long as the associated first or second laser beam emitted during the emission phase and backscattered in the backscattering zone is able to be received by the ground station;

activating the emission phase of a succeeding pair of the emission phase and the reception phase at an end of the reception phase of a preceding pair of the emission phase and the reception phase; and temporally offsetting the emission phases of the first emission/reception sequence with respect to the emission phases of the second emission/reception sequence.

2. The method according to claim 1, wherein said generating at least a first emission/reception sequence and a second emission/reception sequence includes generating a third emission/reception sequence that is associated with a third laser beam.

3. The method according to claim 2, wherein at least two of the first, second, and third emission/reception sequences overlap temporally.

4. The method according to claim 3, wherein data is generated during the temporal overlap, via the associated first, second, or third laser beams, and at least part of the data is used to synchronize transmitted information.

5. The method of claim 3, wherein one of the first, second, or third laser beams is modulated during part of the temporal overlap to transmit a message from the ground station towards the mobile craft.

6. The method of claim 1, wherein for at least one of the first emission/reception sequence or the second emission/reception sequence, the emission phase of a succeeding pair of the emission phase and the reception phase is activated at a deactivation of the reception phase of a preceding pair of the emission phase and the reception phase and is deactivated at an end of a timeframe T1 after its activation, the timeframe T1 satisfying the following relationship:

$T1=(AC+BC)/c$, wherein:

c is the speed of light;

AC is a distance between the ground station and the mobile craft; and $BC=AC-AB$;

AB being a propagation distance of the associated first or second laser beam emitted in the backscattering zone; and wherein the reception phase of the succeeding pair of the emission phase and the reception phase is activated at an end of a timeframe T2 after the deactivation of the emission phase, and is deactivated at an end of a timeframe T3 after its activation, the timeframes T2 and T3 satisfying the following relationships:

$T2=AB/c$ $T3=T1$.

7. The method according to claim 6, wherein AB is determined from a height of the backscattering zone and an angle of elevation of the first or second laser beam emitted.

8. The method according to claim 1, wherein the backscattering zone is a zone in which a first laser flux backscattered by the backscattering zone has an order of magnitude of a second laser flux returned by the retro-reflector.

9. An emission/reception device configured for communication between a ground station and a mobile craft that is provided with at least one retro-reflector configured to modulate a plurality of laser beams received along a reception direction and to return the plurality of laser beams along the reception direction, said mobile craft being located above a backscattering zone over the Earth, said emission/reception device comprising:

at least one emission system provided with at least one laser emitter configured to emit the plurality of laser beams in a direction of the mobile craft and at least one laser beam reception system, wherein the emission/reception device is configured to generate at least two emission/reception sequences, each one being associated with a different laser beam of the plurality of laser beams, the different laser beams for the at least two emission/reception sequences featuring different wavelengths, each of the at least two emission/reception sequences comprising successions of a pair of an emission phase and a reception phase, the emission phase including emitting the associated laser beam from the ground station towards the mobile craft, and the reception phase including receiving the associated laser beam previously emitted by the ground station during the emission phase and returned by the retro-reflector of the mobile craft, wherein the emission/reception device is configured to leave each reception phase deactivated as long as the laser beam emitted during the associated emission phase and backscattered by the backscattering zone is able to be received in the ground station, wherein the emission/reception device is configured to activate the emission phase of a succeeding pair of the emission phase and the reception phase at an end of the reception phase of a preceding pair of the emission phase and the reception phase, the emission phases of a first emission/reception sequence of the at least two emission/reception sequences being temporally offset with respect to the emission phases of a second emission/reception sequence of the at least two emission/reception sequences.

10. The emission/reception device according to claim 9, wherein it is configured to generate three emission/reception sequences.

11. The emission/reception device according to claim 9, further comprising a tracking system.

12. A system for communication between a ground station and a mobile craft, comprising:
   the emission/reception device of claim 9, which is installed in the ground station; and
   at least one retro-reflector that is configured to modulate a laser beam received from the ground station along a reception direction, and to return it after modulation in the reception direction, said retro-reflector being mounted on the mobile craft.

* * * * *

UNITED STATES PATENT AND TRADEMARK OFFICE
CERTIFICATE OF CORRECTION

PATENT NO. : 10,630,386 B2  
APPLICATION NO. : 16/464654  
DATED : April 21, 2020  
INVENTOR(S) : Gouy et al.

Page 1 of 1

It is certified that error appears in the above-identified patent and that said Letters Patent is hereby corrected as shown below:

In the Claims

| Column | Line | Error |
|---|---|---|
| 7 | 42 | Please insert --a-- between "emit" and "plurality" |

Signed and Sealed this  
Thirtieth Day of June, 2020

Andrei Iancu  
*Director of the United States Patent and Trademark Office*